(12) United States Patent
Minabe et al.

(10) Patent No.: US 8,270,278 B2
(45) Date of Patent: Sep. 18, 2012

(54) OPTICAL RECORDING APPARATUS, OPTICAL RECORDING METHOD, RECORDING MEDIUM, AND REPRODUCING METHOD

(75) Inventors: Jiro Minabe, Kanagawa (JP); Yasuhiro Ogasawara, Kanagawa (JP); Shin Yasuda, Kanagawa (JP); Katsunori Kawano, Kanagawa (JP); Koichi Haga, Kanagawa (JP); Kazuhiro Hayashi, Kanagawa (JP); Hisae Yoshizawa, Kanagawa (JP); Makoto Furuki, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 789 days.

(21) Appl. No.: 11/806,042

(22) Filed: May 29, 2007

(65) Prior Publication Data

US 2008/0130430 A1 Jun. 5, 2008

(30) Foreign Application Priority Data

Dec. 1, 2006 (JP) .................................. 2006-325681

(51) Int. Cl.
*G11B 7/00* (2006.01)
(52) U.S. Cl. ...................................... 369/103; 369/112.1
(58) Field of Classification Search ........................ None
See application file for complete search history.

(56) References Cited

U.S. PATENT DOCUMENTS

| 6,147,782 | A  | * | 11/2000 | Daiber et al. ....................... 359/1 |
| 6,614,566 | B1 | * | 9/2003 | Curtis et al. ....................... 359/24 |
| 7,092,133 | B2 | | 8/2006 | Anderson et al. |
| 7,167,286 | B2 | | 1/2007 | Anderson et al. |
| 2005/0286386 | A1 | * | 12/2005 | Edwards et al. ............... 369/103 |
| 2006/0176532 | A1 | | 8/2006 | Toishi |
| 2006/0280095 | A1 | | 12/2006 | Tsukagoshi et al. |
| 2007/0076562 | A1 | * | 4/2007 | Horimai ........................ 369/103 |
| 2007/0146838 | A1 | | 6/2007 | Toishi et al. |
| 2007/0242592 | A1 | * | 10/2007 | Alpert ........................... 369/121 |
| 2008/0316555 | A1 | | 12/2008 | Kaneko et al. |
| 2009/0290202 | A1 | | 11/2009 | Mizushima et al. |

FOREIGN PATENT DOCUMENTS

| JP | A-11-126335 | 5/1999 |
| JP | A-11-311937 | 11/1999 |
| JP | 2002-040908 | 2/2002 |
| JP | A 2004-272268 | 9/2004 |
| JP | A-2005-71557 | 3/2005 |

(Continued)

OTHER PUBLICATIONS

Orlov, Sergei S., Applied Optics, vol. 43, No. 25, pp. 4902-4914, Sep. 1, 2004.

(Continued)

*Primary Examiner* — Mohammad Ghayour
*Assistant Examiner* — Carl Adams
(74) *Attorney, Agent, or Firm* — Oliff & Berridge, PLC

(57) ABSTRACT

An optical recording apparatus comprises: a focusing section that focuses to a transmission type recording medium a recording light beam including a signal light beam and a reference light beam which are radiated from a same direction with a common optical axis; and a focused-position moving section that moves with respect to a direction of the optical axis a focused position where the recording light beam is focused to the transmission type recording medium by the focusing section, wherein an interference fringe formed by the recording light beam is recorded in the transmission type recording medium at each position which is moved by the focused-position moving section.

10 Claims, 11 Drawing Sheets

FOREIGN PATENT DOCUMENTS

| | | |
|---|---|---|
| JP | A-2005-293630 | 10/2005 |
| JP | A 2005-322382 | 11/2005 |
| JP | A-2006-189597 | 7/2006 |
| JP | A-2006-527395 | 11/2006 |
| JP | A 2007-25417 | 2/2007 |
| WO | WO 2004/112045 A2 | 12/2004 |
| WO | WO 2006/093054 A1 | 9/2006 |
| WO | WO 2006/114835 | 11/2006 |

OTHER PUBLICATIONS

Aug. 31, 2010 Office Action issued in Japanese Patent Application No. 2006-325681 (with English translation).

Office Action issued in JP Application No. 2006-325681 on Nov. 16, 2010 (with English translation).

* cited by examiner

OPTICAL RECORDING APPARATUS, OPTICAL RECORDING METHOD, RECORDING MEDIUM, AND REPRODUCING METHOD

CROSS-REFERENCE TO RELATED APPLICATIONS

This application is based on and claims priority under 35 USC 119 from Japanese Patent Application No. 2006-325681 filed Dec. 1, 2006.

BACKGROUND (i) Technical Field

The present invention relates to an optical recording apparatus for recording a hologram, an optical recording method, a recording medium, and a reproducing method.

(ii) Related Art

Among optical recording technologies, a holographic recording technology is known as a technology which enables large-capacity, high-speed recording and reproduction. In the holographic recording technology, the recording capacity of a holographic recording medium can be increased by recording holograms at an identical or substantially identical position on the holographic recording medium.

SUMMARY

According to an aspect of the invention, there is provided an optical recording apparatus comprising: a focusing section that focuses to a transmission type recording medium a recording light beam including a signal light beam and a reference light beam which are radiated from a same direction with a common optical axis; and a focused-position moving section that moves with respect to a direction of the optical axis a focused position where the recording light beam is focused to the transmission type recording medium by the focusing section, wherein an interference fringe formed by the recording light beam is recorded in the transmission type recording medium at each position which is moved by the focused-position moving section.

BRIEF DESCRIPTION OF THE DRAWINGS

Exemplary embodiments of the present invention will be described in detail based on the following figure, wherein.

DETAILED DESCRIPTION

Figure 1:
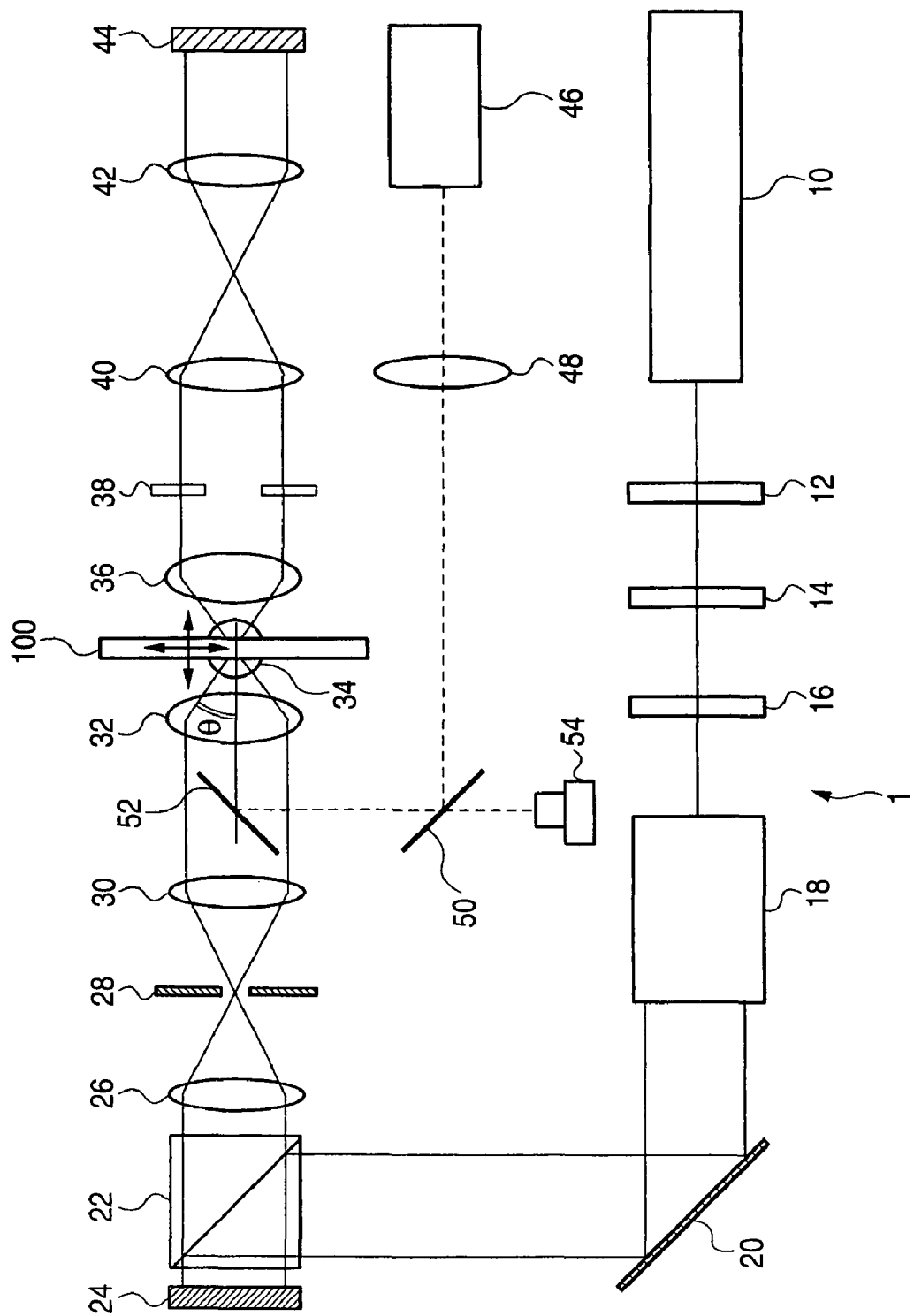
FIG. 1 is a diagram illustrating the system configuration of a holographic recording and reproducing apparatus.

In the invention, a holographic recording medium of a transmission type which transmits light is used as the holographic recording medium for recording a hologram. In the invention, the reason for using not a reflection type recording medium but the transmission type recording medium as the holographic recording medium is based on as follows.

In the reflection type recording medium, as a focal point is constantly brought to a reflecting surface, the configuration of an apparatus for forming an image on a fixed two-dimensional sensor array (light receiving element) is made possible. If the focal position of the signal light beam is changed with respect to the reflection type recording medium, the image-forming position and size change correspondingly. For this reason, in the case where the reflection type recording medium is used, if data is recorded by shifting the signal light beam together with the reference light beam in the optical axis direction, it is difficult to reproduce the recorded data. Even if reproduction of the data is to be realized, an extremely complex reproducing optical system is required.

In addition, also in the case where the transmission type recording medium is used, in the related art, the so-called pixel matching has been carried out in which a spatial light modulator (SLM) and pixels of the sensor array are completely matched. In this method, if the position of the recording medium which is present between Fourier transform lenses changes, the formed image becomes distorted. Therefore, to configure a proper 4f system, a technique has been proposed for inserting a compensating plate at a position symmetrical with the recording medium (refer to Applied Optics Vol. 43, No. 25, 4902-4914 (2004)). Even this conventional technique, however, does not realize the recording while shifting both the signal light beam and the reference light beam in the optical axis direction in the case where holograms are recorded in the transmission type recording medium.

Accordingly, the present inventor discovered that in a case where the so-called oversampling is adopted in which digital data represented by the "light" or "dark" of one pixel of the signal light beam data is received by a plurality of light receiving elements, even if the signal light beam is shifted in the optical axis direction, the recorded hologram can be read. Further, the inventor discovered that, to enhance the selectivity in the film thicknesswise direction, the reference light beam is focused by the same lens as that for the signal light beam, and its focusing angle is set to a predetermined condition (sin θ>0.2), whereby holograms can be recorded in the thicknesswise direction with a pitch of one-tenth or thereabouts of the conventional pitch.

In addition, on the basis of the above-described knowledge, in the technique for recording holograms in the transmission type recording medium, the invention realized the shifting of the focused position of the signal light beam in the thicknesswise direction (optical axis direction of the signal light beam) without breaking the image-forming relationship of the optical system. Furthermore, by limiting the hologram forming region and by recording the signal light beam by shifting it, the correlation of signal light wavefronts which are multiplexed is reduced, and high shift selectivity is realized.

Hereafter, referring to the accompanying drawings, a description will be given of an exemplary embodiment for carrying out the invention.

In the holographic recording and reproducing apparatus in accordance with this exemplary embodiment, the signal light beam and the reference light beam having a common optical axis are radiated to the holographic recording medium from the same direction. The signal light beam and the reference light beam interfere with each other on the holographic recording medium, thereby forming a diffraction grating (interference fringe) at the irradiated spot. The information provided in the signal light beam is thus stored in the holographic recording medium. Hereafter, the light beam which includes the signal light beam and the reference light beam which are radiated to the holographic recording medium will be referred to as the recording light beam. The present invention is characterized in that a coaxial recording system is adopted in which the recording light beam consists of a single light beam in which the signal light beam and the reference light beam have a common optical axis.

The holographic recording and reproducing apparatus in accordance with this exemplary embodiment multiplex records holograms in the optical axis direction of the recording light beam (in the thicknesswise direction of the holographic recording medium) and in the in-plane direction of the holographic recording medium while moving the focused position of the recording light beam in the optical axis direction of the recording light beam (in the thicknesswise direction of the holographic recording medium).

Furthermore, as for the information stored in the holographic recording medium, only a reading light beam, which is equivalent to the reference light beam used on the recording, is applied to the diffraction grating formed in the holographic recording medium, a reproduced light beam (diffracted light) emergent therefrom is received, and the information is read out on the basis of the reproduced light beam thus received.

FIG. 1 shows the system configuration of a holographic recording and reproducing apparatus 1 in accordance with this exemplary embodiment. The holographic recording and reproducing apparatus 1 is comprised of a laser light source 10; a shutter 12; an $\pi/2$ wavelength plate 14; a polarizing plate 16; an enlarging/collimating optical system 18; a mirror 20; a polarization beam splitter 22; spatial light modulators 24; lenses 26 and 30 constituting a relay lens system; an aperture 28; Fourier transform lenses 32 and 36; a recording medium positioning control mechanism unit 34; an aperture 38; lenses 40 and 42 constituting a relay lens system; a sensor array 44; a positioning light source (a laser is used here) 46; a collimator lens 48; a beam splitter 50; dichroic mirror 52; and a light receiving element 54.

The laser light source 10 emits a laser beam which serves as a light source of a signal light beam and a reference light beam for recording a hologram. Laser light of a predetermined wavelength (e.g., that of a green laser with a wavelength of 532 nm) which is sensitive to an optical recording layer of a holographic recording medium 100 is emitted from the laser light source 10.

The shutter 12 is provided on the optical path of the laser beam emitted from the laser light source 10. The laser beam is shut off as the shutter 12 is closed. Further, the laser beam passed through the shutter 12 has its light intensity and polarizing direction adjusted by being passed through the $\pi/2$ wavelength plate 14 and the polarizing plate 16.

The laser beam which passed through the polarizing plate 16 is converted into parallel light of a predetermined diameter by the enlarging/collimating optical system 18. The laser beam converted into the parallel light by the enlarging/collimating optical system 18 is reflected by the mirror 20 and is incident on the polarization beam splitter 22.

The laser beam reflected by the polarization beam splitter 22 is incident on the spatial light modulator 24.

The spatial light modulator 24 polarizes and modulates the later light incident from the polarization beam splitter 22 with a pattern corresponding to recording information. The modulated laser beam is incident again on the polarization beam splitter 22, and since the polarization beam splitter 22 transmits only the p-polarized light, the polarization beam splitter 22 is capable of modulating the laser beam into light having a light intensity modulated pattern in which the intensity of the light has been modulated. The recording information is represented by a pattern image of light and dark in which, for example, digital data "0s and 1s" are made to correspond to "light and dark."

Figure 2:
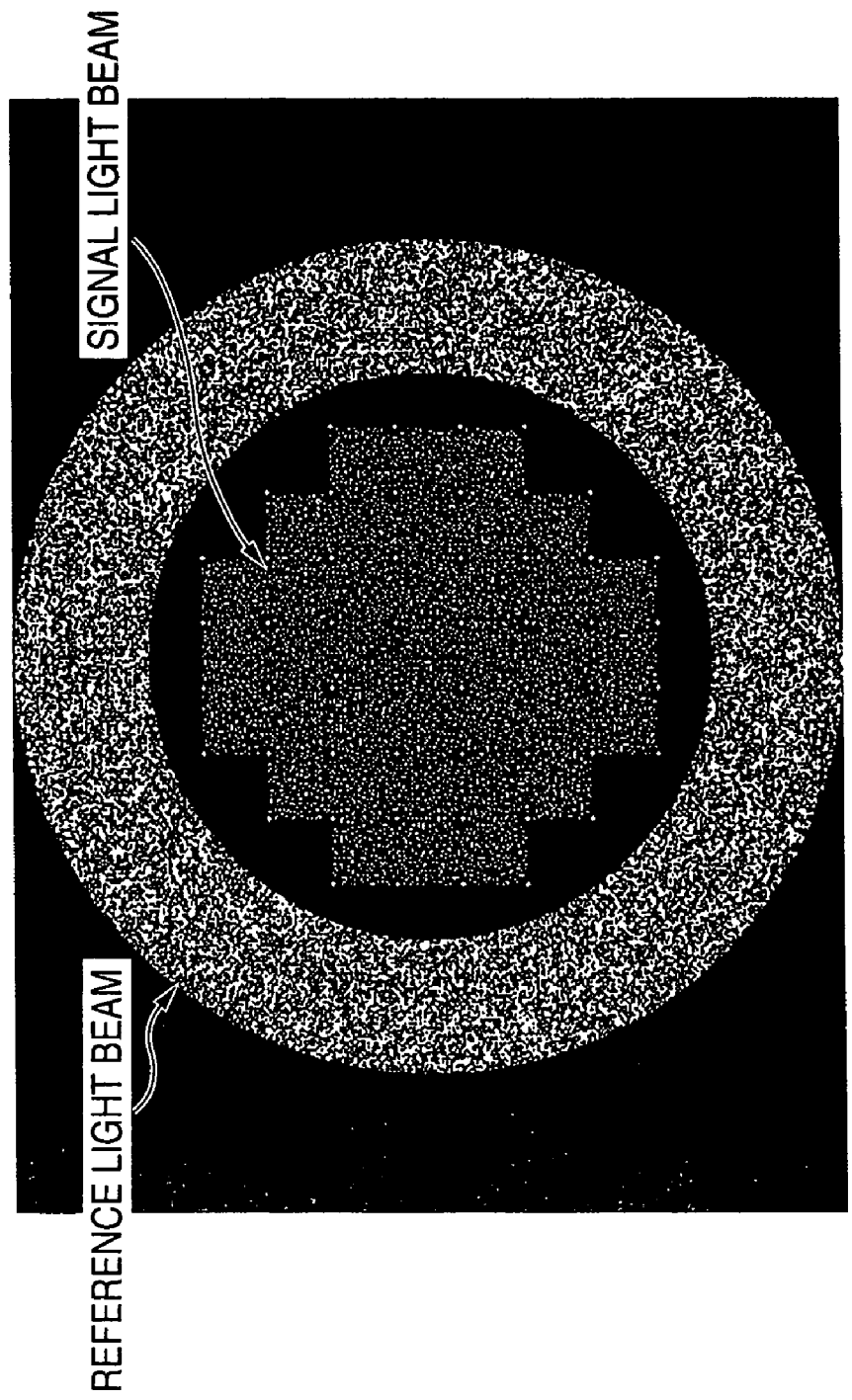
FIG. 2 is a diagram illustrating an example of a display pattern of a reference light beam and a signal light beam.

FIG. 2 shows an example of a display pattern of the reference light beam and the signal light beam modulated by the spatial light modulator 24. As shown in FIG. 2, the signal light beam is disposed in a central portion of the recording light beam, and the reference light beam is disposed in an outer periphery of the signal light beam. It should be noted that although the reference light beam is not modulated on the basis of a signal, the reference light beam may be modulated. By modulating the reference light beam, it is possible to enlarge the overlapping between the signal light beam and the reference light beam in the recording medium. In FIG. 2, the reference light beam is modulated with a random intensity pattern in a pixel size for representing the signal light beam. There is an advantage that, by imparting random modulation to the reference light beam with a period equivalent to that of the data pattern, a region necessary for data recording is uniformly irradiated with the reference light beam.

The recording light beam including the signal light beam and the reference light beam emitted from the spatial light modulator 24 is incident on the lens 26. The recording light beam is condensed so as to pass through the aperture 28 (pinhole), and a predetermined frequency component is cut off when passing through the aperture 28. Although the predetermined frequency component is cut off by the aperture 28, and recording which makes more effective use of the recording medium becomes possible, the aperture 28 is not essential in carrying out the invention. Further, the recording light beam which passes through the aperture 28 is converted again into parallel light by the lens 30 and is incident on the Fourier transform lens 32.

The Fourier transform lens 32 focuses the signal light beam and the reference light beam onto the holographic recording medium 100. Further, in the position to which the signal light beam and the reference light beam are focused, an interference fringe in which the signal light beam and the reference light beam interfere is formed in an optical recording layer of the holographic recording medium 100. In this exemplary embodiment, the Fourier transform lens 32 is characterized by being a lens of a large numerical aperture (NA), but its details will be described later.

In addition, in the invention, a transmission-type holographic recording medium through which light is transmitted is used as the holographic recording medium 100 for recording a hologram, as described above.

Figure 3:
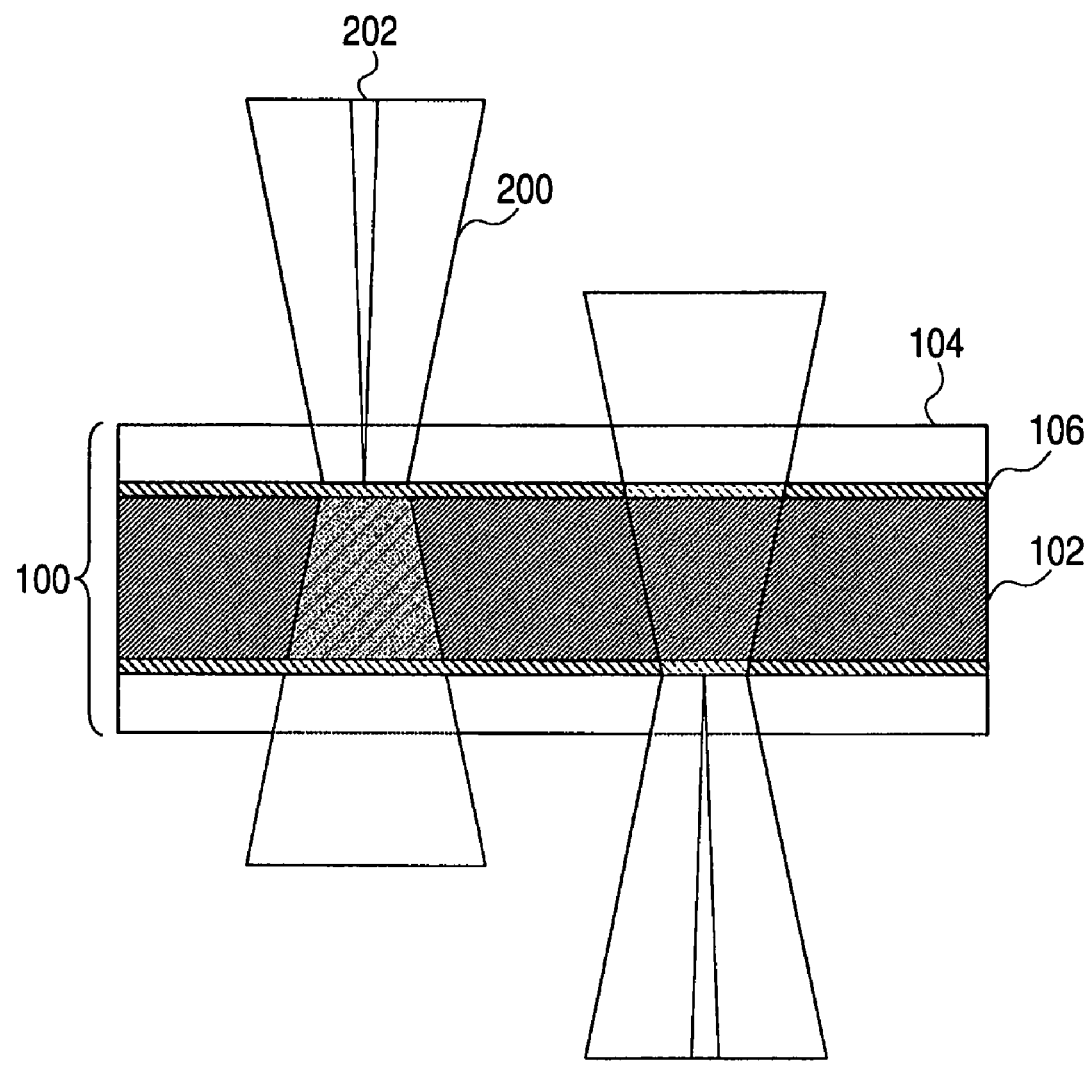
FIG. 3 is a diagram illustrating an example of the configuration of a holographic recording medium.

FIG. 3 shows an example of the configuration of the holographic recording medium 100 in accordance with this exemplary embodiment. As shown in FIG. 3, the holographic recording medium 100 is configured by including an optical recording layer 102, a protective layer 104, and a selectively reflecting layer 106.

The optical recording layer 102 is a holographic recording layer in which a hologram (interference fringe) formed by the recording light beam is recorded.

The protective layer 104 is a layer for protecting the optical recording layer 102 and the selectively reflecting layer 106, and is formed of a transparent glass substrate or the like.

The selectively reflecting layer 106 is provided in such a way as to contact the interface of the optical recording layer 102, and selectively reflects a laser beam 202 (e.g., a red semiconductor laser beam with a wavelength of 650 nm; hereafter referred to as the "positioning laser beam") as the positioning light having a wavelength different from that of a recording light beam 200. A laser beam having small sensitivity to the material of the optical recording layer 102 of the holographic recording medium 100 is used as the positioning laser beam 202.

The positioning laser beam 202 is emitted from the positioning laser light source 46. The emitted positioning laser beam 202 is converted into parallel light by the collimator lens 48. The positioning laser beam 202 converted into the parallel light passes through the beam splitter 50 and is incident on the dichroic mirror 52. The optical path of the positioning laser beam 202 is made identical as that of the recording light beam by the dichroic mirror 52. When the positioning laser beam 202 is then incident on the holographic recording medium 100, part of the positioning laser beam 202 is reflected by the selectively reflecting layer 106. The reflected light reflected by the selectively reflecting layer 106 is reflected by the dichroic mirror 52 and the beam splitter 50, and is received by the light receiving element 54. The light receiving element 54 outputs a servo signal for the focal position control of the recording light beam on the basis of the received reflected light.

The holographic recording medium 100 is held in the recording medium positioning control mechanism unit 34. The recording medium positioning control mechanism unit 34 is capable of moving in the optical axis direction of the recording light beam. On the basis of the servo signal outputted from the light receiving element 54, the recording medium positioning control mechanism unit 34 adjusts the distance between the holographic recording medium 100 and the Fourier transform lens 32 by adjusting its position in the optical axis direction. The focused position where the recording light beam is focused to the holographic recording medium 100 is thus controlled. In addition, the positioning laser beam 202 may be made incident from both sides of the holographic recording medium 100, as shown in FIG. 3.

When the data recorded in the holographic recording medium 100 is read out, only the reference light beam is applied to the holographic recording medium 100. As the reference light beam is applied to a diffraction grating (interference fringe) formed on the holographic recording medium 100, reproduced light (diffracted light) which is transmitted through the holographic recording medium 100 is emergent. The reproduced light includes the recording light beam applied when the diffraction grating was formed. The emergent reproduced light is subjected to inverse Fourier transform by the Fourier transform lens 36. The reference light beam is cut off when passing through the aperture 38. Although the signal light beam can be detected with a high SN ratio as the aperture 38 cuts off the reference light beam, the aperture 38 is not essential in carrying out the invention. Further, the reproduced light which has been relayed by the lenses 40 and 42 is received by the sensor array 44. In the sensor array 44, data superposed on the signal light beam is read out on the basis of the light intensity modulation pattern of the signal light beam contained in the reproduced light. It should be noted that, in this exemplary embodiment, the sensor array 44 receives light representing 1-bit data by four (2×2) light receiving elements.

As described above, in this exemplary embodiment, a lens whose numerical aperture (NA) is greater than a predetermined value is used as the Fourier transform lens 32. Specifically, the recording light beam is focused by using as a maximum angle an angle $\theta$ which satisfies $\sin \theta > 0.2$ with respect to the optical axis, i.e., the Fourier transform lens 32 is characterized in that at least its numerical aperture (NA) is greater than 0.2. The reason for selecting the above-described range of the angle $\theta$ will be described below.

Figure 4A:
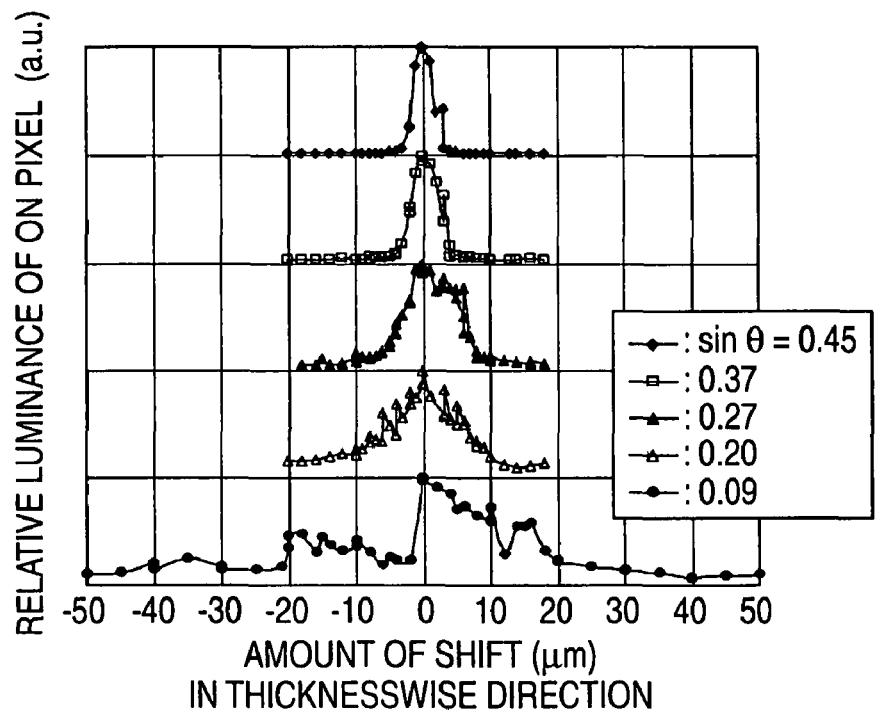
FIGS. 4A and 4B are diagrams illustrating the results of measurement concerning the amount of shift until diffracted light disappears.

FIG. 4A shows the results of measurement of the average luminance of ON pixels (light pixels) which were reproduced while moving the focal position of the reference light beam in the optical axis direction after holograms were recorded in a holographic recording medium. The measurement was recorded when recording and reproduction were made at different focusing angles ($\sin \theta$: 0.45, 0.37, 0.27, 0.20, and 0.09). In addition, a holographic recording medium in which the thickness of the optical recording layer was 1 mm was used in the aforementioned measurement. In FIG. 4A, the abscissa shows the amount of shift by which the reference light beam was moved in the optical axis direction from the position where the hologram was recorded. The ordinate shows the relative luminance of the ON pixel. It should be noted that FIG. 4A collectively shows the results of measurement for the respective focusing angles ($\sin \theta$), and the relative luminance on the ordinates shows that the luminance is small where the value is low concerning the respective focusing angles ($\sin \theta$), and the luminance is large where the value is high.

It can be appreciated that, as shown in FIG. 4A, at the focusing angle ($\sin \theta$) of 0.45, for example, the diffracted light disappears if the reference light beam moves by 5 μm or thereabouts from the position where the hologram has been recorded. Accordingly, at the focusing angle ($\sin \theta$) of 0.45, holograms can be multiplex recorded with an infinitesimal shift amount of 5 μm or thereabouts. In addition, FIG. 4A shows that the greater the focusing angle ($\sin \theta$), the smaller the shift amount until the diffracted light disappears.

Figure 4B:
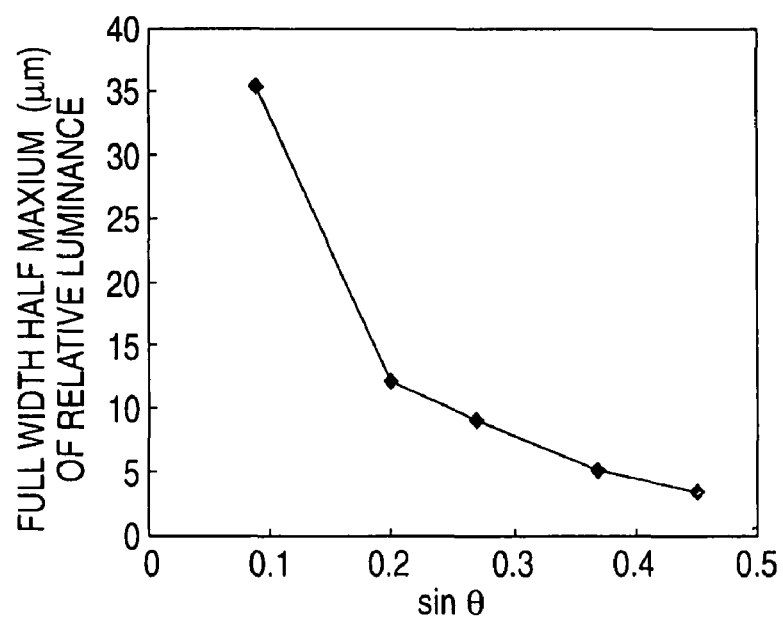

FIG. 4B shows a graph in which the full width half maximum of the relative luminance of the ON pixel with respect to the focusing angle ($\sin \theta$) is plotted in the above-described measurement results. As shown in FIG. 4B, in the case where the focusing angle ($\sin \theta$) exceeded 0.2, the full width half maximum became 10 μm or less, and it can be understood that multiplex recording is possible with an infinitesimal shift amount as compared to the conventional case where the full width half maximum is 100 μm.

From the above-described knowledge, it was found that focusing should preferably be effected with a focusing angle ($\sin \theta$) of greater than 0.2, i.e., at least a lens whose numerical aperture is greater than 0.2 should preferably be used as the Fourier transform lens for focusing the reference light beam on the holographic recording medium.

Figure 5A:
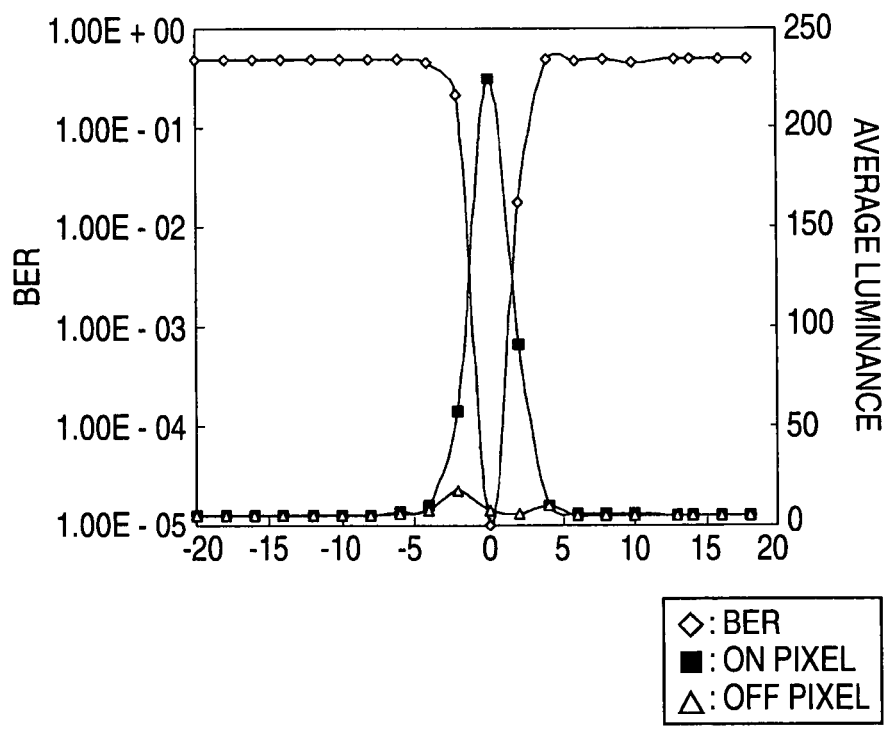
FIGS. 5A and 5B are diagrams illustrating the results of measurement concerning the readout of recorded digital data.

Next, FIG. 5A shows respective average luminance of On pixels and OFF pixels and bit error rates of reproduced digital data when the digital data recorded in the holographic recording medium 100 was reproduced by the holographic recording and reproducing apparatus 1 while shifting the reference light beam in the optical axis direction. Here, as the bit error rate (BER), values in the case where error correction was not carried out were used. Further, the focusing angle ($\sin \theta$) with respect to the holographic recording medium 100 was set to 0.45.

As shown in FIG. 5A, it was found that in the case where holograms are recorded by setting the focusing angle (sin θ) to 0.45, the diffracted light disappears with a shift amount of 5 μm, and an ensuing hologram can be sufficiently recorded. In addition, it was also found that the error bit rate at the time of reproducing the recorded hologram sufficiently satisfies an allowable value (0.005).

Figure 5B:
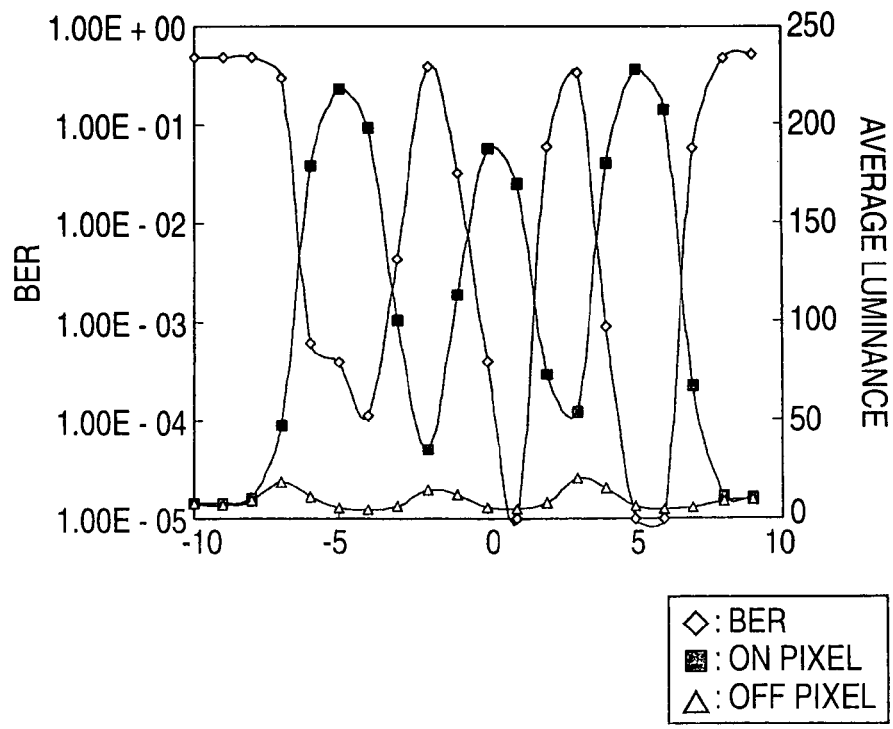

In addition, FIG. 5B shows average luminance of ON pixels and OFF pixels and bit error rates of reproduced digital data when digital data was multiplex recorded in the holographic recording medium 100 with 3 degrees of multiplicity while shifting the reference light beam by 5 μm each in the optical axis direction, and the recorded digital data was reproduced while shifting the reference light beam in the optical axis direction.

Further, it was found that, as shown in FIG. 5B, in the case where digital data is multiplex recorded with 3 degrees of multiplicity at 5-μm intervals, the error bit rate at the time of reproducing the recorded hologram satisfies the allowable value (0.005), and multiplex recording can be performed with excellent accuracy.

Next, on the basis of the measurements conducted as described below, a description will be given of at what positions of the optical recording layer of the holographic recording medium the holograms should preferably be recorded.

Holograms were recorded while changing the amount of defocusing in the thicknesswise direction of the holographic recording medium (optical axis direction of the recording light beam) by using a central portion in the thicknesswise direction of the holographic recording layer as the original position. The amount of defocusing means the amount of shift of the focal position of the recording light beam from the central portion in the thicknesswise direction of the holographic recording medium.

Figure 6A:
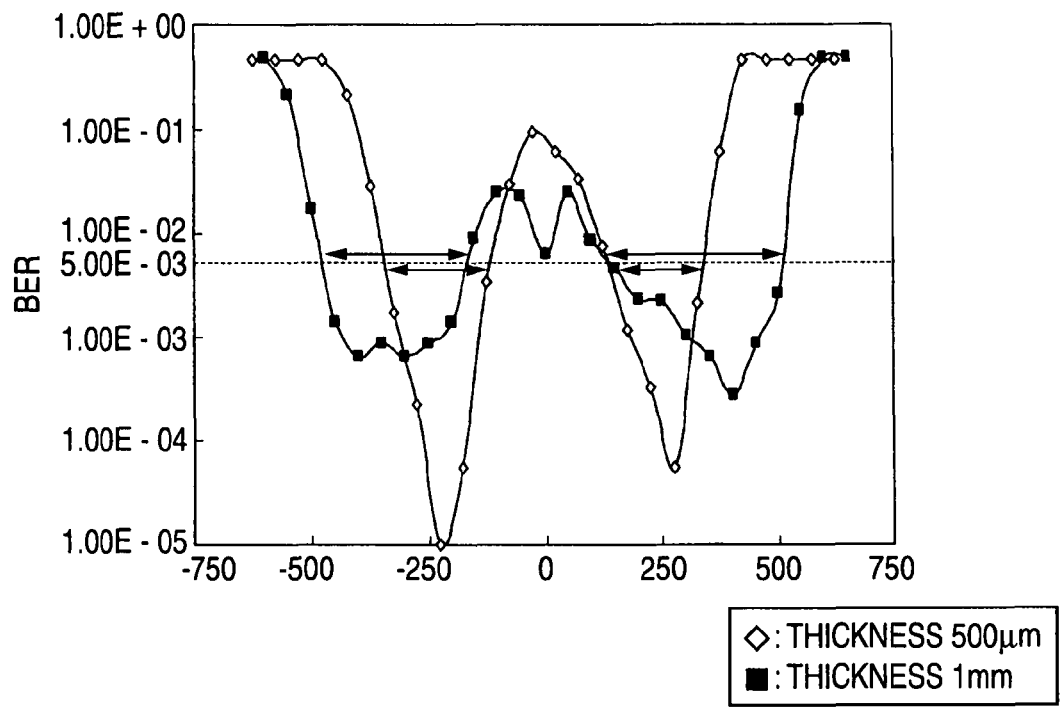
FIGS. 6A and 6B are diagrams illustrating bit error rates measured in correspondence with the amount of defocusing.
Figure 6B:
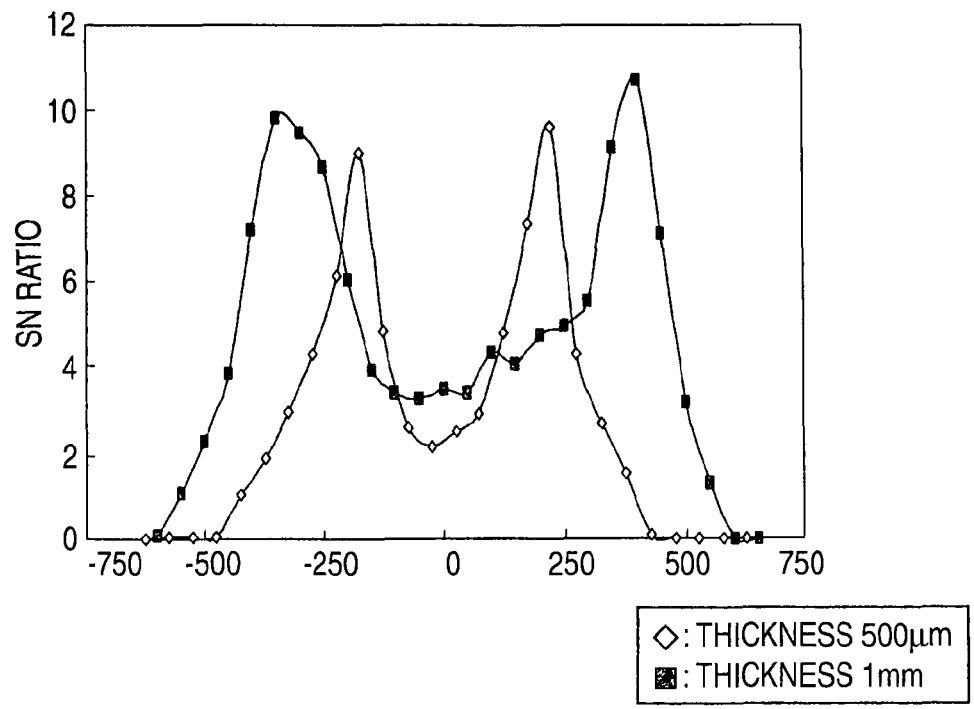

FIG. 6A is a graph in which the abscissa shows the amount of defocusing and the ordinate shows the bit error rate when the digital data was reproduced. In addition, FIG. 6B is a graph in which the abscissa shows the amount of defocusing and the ordinate shows the SN ratio when the digital data was reproduced. The aforementioned measurements were carried out respectively for cases where the thickness of the optical recording layer was 500 μm and where it was 1 mm.

As shown in FIGS. 6A and 6B, it was found that the closer to the interface of the optical recording layer than to the central portion of the optical recording layer the focal position of the recording light beam is, the lower the bit error rate is, and the recorded data is reproduced with the higher SN ratio. Further, in a case where the target value of the bit error rate is set to 0.005 ($5e^{-3}$), the amount of defocusing which satisfies the target value corresponds to the range shown by arrows in FIG. 6A. Namely, recording can be effected while satisfying the targeted bit error rate in the range of approximately 0.5 mm in the case where the film thickness of the optical recording layer is 500 μm and in the range of approximately 0.75 mm in the case where the film thickness of the optical recording layer is 1 mm. If multiplex recording is performed while shifting the recording light beam by 5 μm in the optical axis direction, theoretically multiplex recording with as much as 100 degrees of multiplicity becomes possible with a holographic recording medium of 500 μm, and multiplex recording with as much as 150 degrees of multiplicity becomes possible with a holographic recording medium of 1 mm.

Figure 7A:
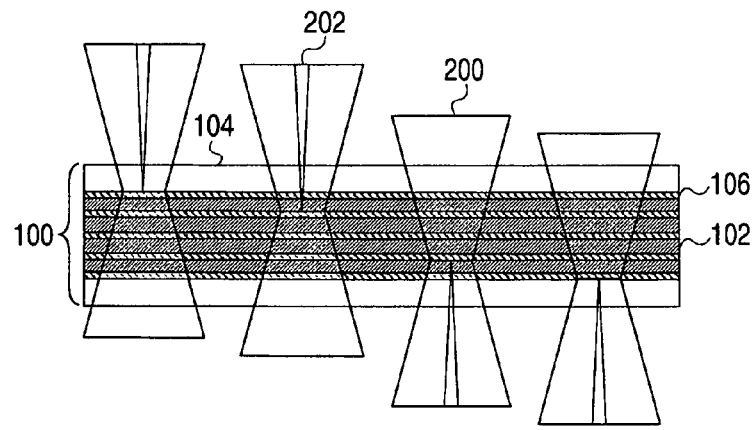
FIGS. 7A to 7C are diagrams illustrating other examples of the configuration of the holographic recording medium.
Figure 7B:
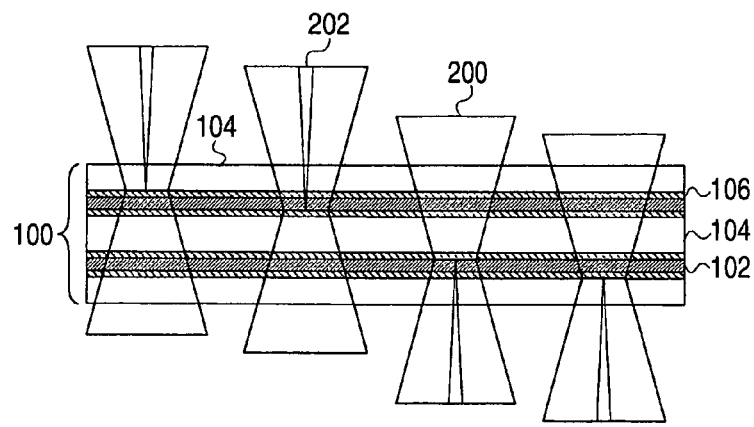
Figure 7C:
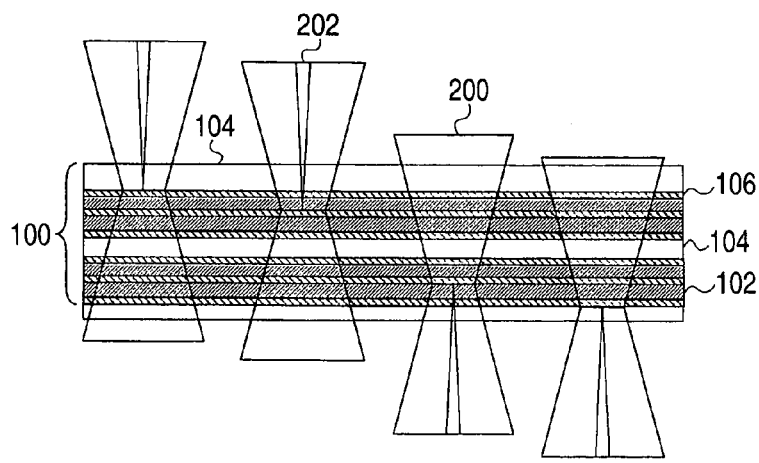

In addition, as shown in FIG. 7A, the holographic recording medium is not limited to the configuration in which the optical recording layer is one layer, and may be configured by alternately laminating the selectively reflecting layer and the optical recording layer. Further, as shown in FIG. 7B, a gap may be provided between laminates in each of which the selectively reflecting layer and the optical recording layer have alternately been laminated. Still further, as shown in FIG. 7C, the selectively reflecting layer and the optical recording layer may alternately be laminated in plural layers, and a gap may be provided between some or all of the laminates.

In each of the laminated optical recording layers, when the positioning of the focused position of the recording light beam is carried out, part of the positioning laser beam is reflected by the selectively reflecting layer corresponding to that optical recording layer, the reflected positioning laser beam is received, and a servo signal for the focal position control of the recording light beam is outputted on the basis of the received reflected light. The positioning control mechanism adjusts the position in the optical axis direction on the basis of the outputted servo signal. Servo control using the reflected light of the positioning laser beam is thus performed with respect to each optical recording layer so as to improve the positioning accuracy with respect to each optical recording layer. Thus, the present invention can be applied to cases where the optical recording layer of the holographic recording medium is multilayered.

Figure 8:
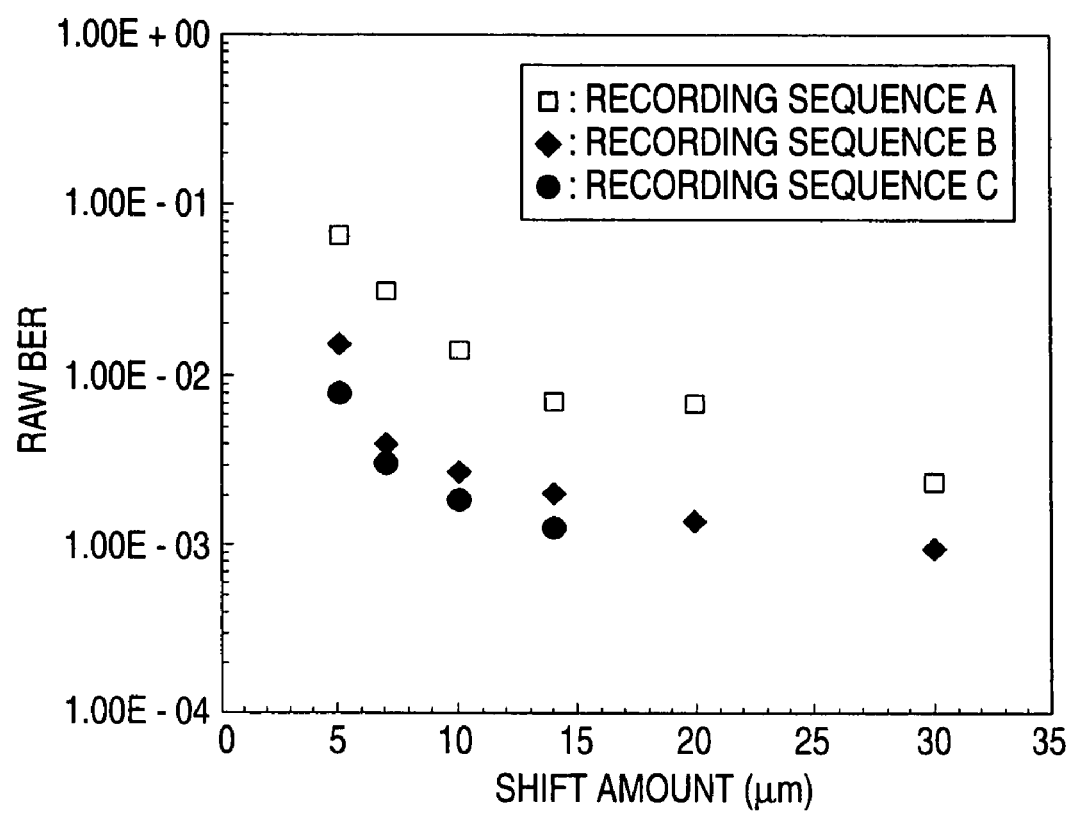
FIG. 8 is a diagram illustrating bit error rates measured in correspondence with recording sequences of three-dimensional shift multiplex recording.

FIG. 8 shows the results of measurement of the bit error rate when holograms recorded in the respective recording sequences were recorded in cases where multiplex recording was carried out by changing the order (recording sequence) of shifting the recording light beam in the in-plane direction and in the thicknesswise direction (optical axis direction) of the holographic recording medium. Here, the bit error rate when holograms were recorded while changing the amount of shift in the in-plane direction of the holographic recording medium and the holograms recorded with each shift amount were reproduced, was measured for each recording sequence. Incidentally, three recording sequences were used for measurement.

Figure 9A:
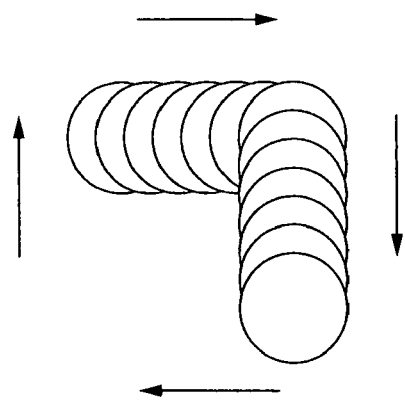
FIGS. 9A to 9C are diagrams illustrating sequences of recording holograms.

First, a first recording sequence A is a recording sequence in which 49 (7 horizontal×7 vertical) holograms are recorded while being shifted in a convoluted manner, as shown in FIG. 9A. It should be noted that the recording sequence A is a recording sequence of a conventional type.

Figure 9B:
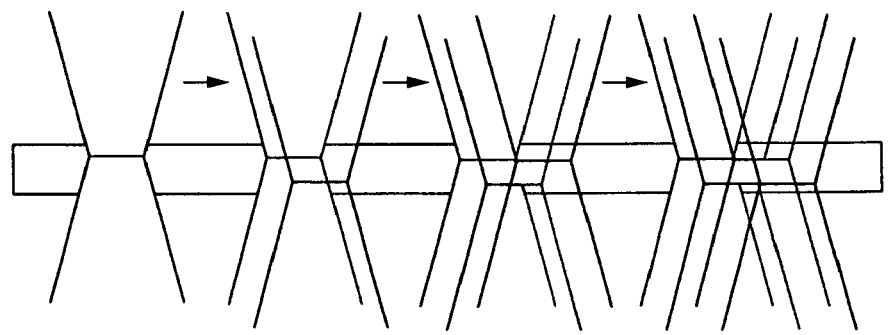

A second recording sequence B is a recording sequence in which 49 (7 horizontal×7 vertical) holograms are recorded in two upper and lower layers, alternately, as shown in FIG. 9B.

Figure 9C:
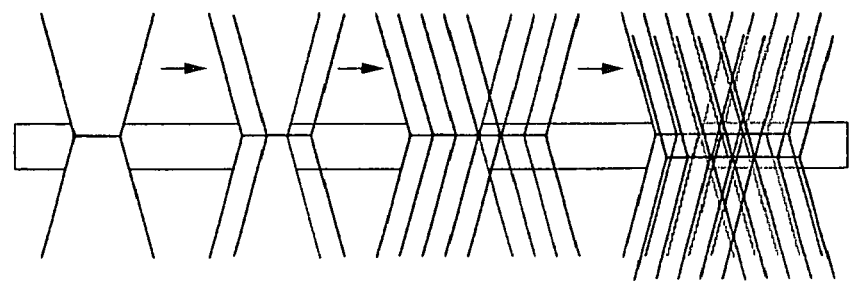

A third recording sequence C is a recording sequence in which, as shown in FIG. 9C, 25 (5 horizontal×5 vertical) holograms are first recorded in a first layer with a double shift amount as compared to the cases of the above-described recording sequences A and B and are further recorded in a similar manner by offsetting a half shift amount as compared to the first layer. The shift amount in the upper and lower layers in the recording sequences B and C were set to 600 μm. It should be noted that the number of holograms recorded in the respective recording sequence was 49 in the recording sequences A and B and 50 in the recording sequence C and was thus set to be substantially identical.

FIG. 8 shows the bit error rate when holograms recorded in the respective recording sequences A, B, and C were recorded. As shown in FIG. 8, the recording sequence C was the lowest in the bit error rate, and the bit error rate became higher in the order of the recording sequence B and the recording sequence A. Therefore, multiplex recording with a low bit error rate is possible in accordance with the recording sequences B and C rather than the recording sequence A.

Figure 10:
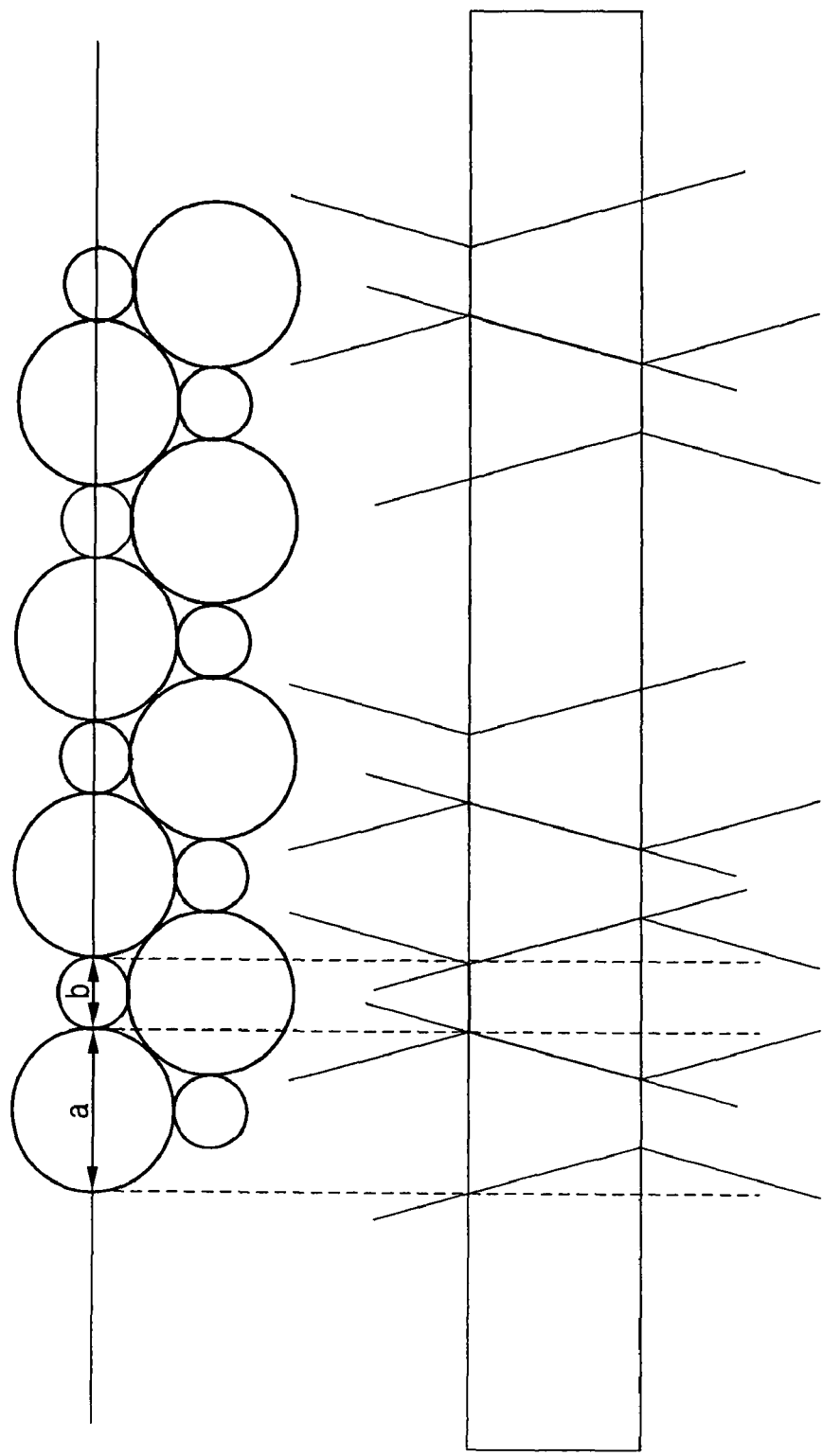
FIG. 10 is a diagram illustrating an example of the sequence of recording holograms.

Referring to FIG. 10, a description will be given of an example of the sequence of recording holograms for making effective use of the dynamic range of the holographic recording medium.

Figure 11:
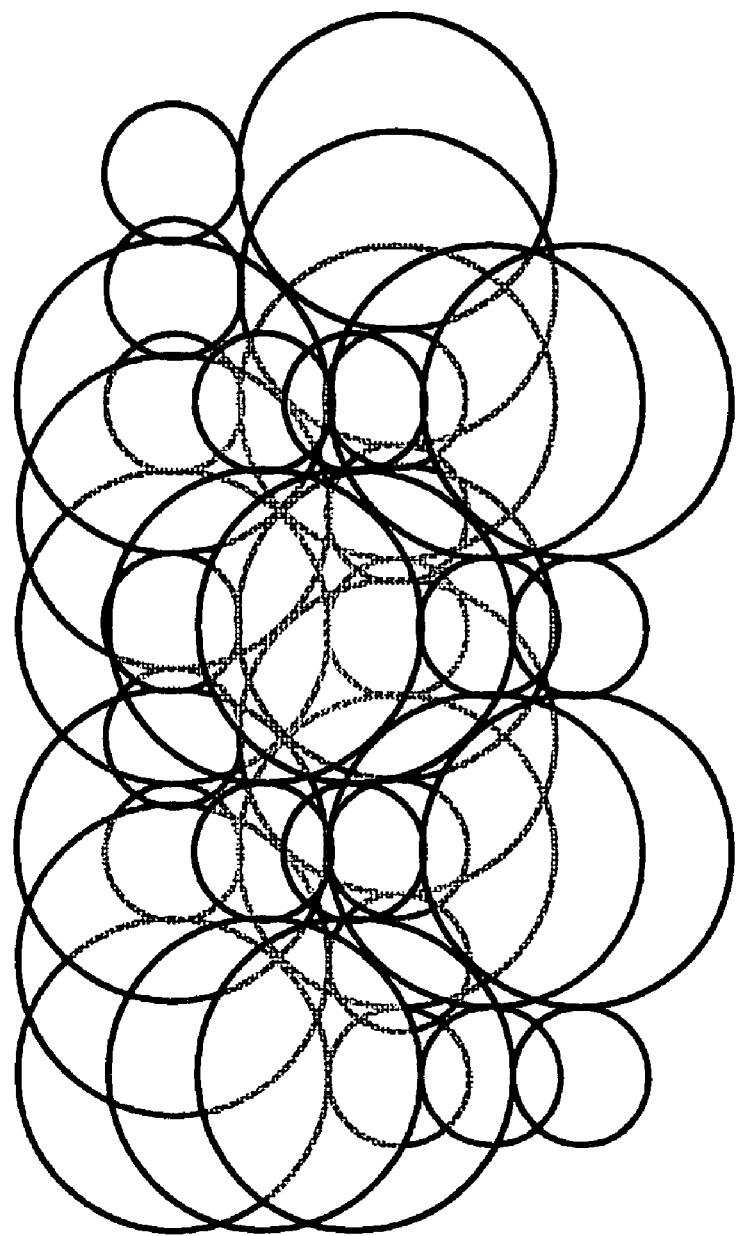
FIG. 11 is a diagram illustrating an example of holograms multiplex recorded in the in-plane direction of the recording medium.

In the recording sequence in FIG. 10, holograms to be recorded are disposed in two upper and lower layers in the vicinities of the interfaces of the optical recording layer. Layers which make it possible to record with a high SN ratio, as described above, are selected as the two layers for recording the holograms. Further, in a case where the diameters of spots based on the recording light beams are set to be a and b for the upper and lower layers, as shown in FIG. 10, the recording light beam is focused such that the distance between the holograms becomes (a+b)/2 so that the contiguous holograms do not overlap. The recording material of the optical recording layer is consumed uniformly by recording the holograms in this manner. In addition, multiplex recording also becomes possible by performing the recording by shifting the hologram groups shown in FIG. 10 in the in-plane direction of the holographic recording medium, as shown in FIG. 11.

Although a detailed description has been given above of the exemplary embodiment of the invention, the invention is not limited to the exemplary embodiment, and it goes without saying that the invention is applicable to known techniques.

What is claimed is:

1. An optical recording apparatus comprising: a focusing section that focuses to a transmission type recording medium a recording light beam including a signal light beam and a reference light beam which are radiated from a same direction with a common optical axis, the signal light beam including a light and dark pattern representing digital data; and a focused-position moving section that moves in a direction of the optical axis and a direction parallel to one face of the recording medium a focused position where the recording light beam is focused to the transmission type recording medium by the focusing section, wherein the focused position is moved by moving the transmission type recording medium, the focused-position moving section sets the focus position at a first position to form a first hologram in the transmission type recording medium at the first position, and the focused-position moving section sets the focus position at a second position to form a second hologram in the transmission type recording medium at the second position, the first position being different from the second position in the direction of the optical axis, and the focusing section focuses the recording light beam at an angle θ which satisfies sin θ>0.2 with respect to the optical axis.

2. The optical recording apparatus according to claim 1, wherein the focused-position moving section moves the focused position of the recording light beam to within a predetermined range from each of interfaces of an optical recording layer of the transmission type recording medium, the each of interfaces intersecting the optical axis of the recording light beam, so as to allow the interference fringes formed by the recording light beam to be respectively recorded within the respective predetermined ranges in the optical recording layer.

3. The optical recording apparatus according to claim 1, wherein the transmission type recording medium comprises a reflecting film for reflecting a positioning light beam of a wavelength different from a wavelength of the recording light beam,
wherein the optical recording apparatus further comprise: an irradiating section that radiates the positioning light beam; and
a light receiving section that receives a reflected light beam in which the positioning light beam radiated by the irradiating section is reflected by the reflecting film, and
wherein the focused position of the recording light beam is moved based on the reflected light beam received by the light receiving section.

4. The optical recording apparatus according to claim 3, wherein the transmission type recording medium is formed by laminating a plurality of optical recording layers, the reflecting film being formed between the optical recording layers,
wherein the light receiving section receives the reflected light beams reflected by the respective reflecting films, and
wherein the focused position of the recording light beam in each of the optical recording layers is moved based on the reflected light beams respectively received by the light receiving section.

5. The optical recording apparatus according to claim 2, wherein the optical axis of the recording light beam intersects the interface of the optical recording layer at two portions, and
each of the predetermined ranges is at a place substantially equidistanced from each point of intersection between the optical axis of the recording light beam and the interface of the optical recording layer, and
the interference fringes are recorded at substantially symmetrical positions from a center of the optical recording layer in a thicknesswise direction of the optical recording layer.

6. A reproducing method for reproducing data, comprising receiving by a plurality of light receiving elements 1-bit digital signals contained in diffracted light obtained by applying a reading light beam to the transmission type recording medium in which the data is recorded by the optical recording apparatus according to claim 1.

7. The optical recording apparatus according to claim 1, wherein the signal light beam and the reference light beam are radiated from a same side of the recording medium.

8. An optical recording method comprising: focusing to a transmission type recording medium a recording light beam including a signal light beam and a reference light beam which are radiated from a same direction with a common optical axis, the signal light beam including a light and dark pattern representing digital data; moving in a direction of the optical axis and a direction parallel to one face of the recording medium a focused position where the recording light beam is focused to the transmission type recording medium in the focusing; and setting the focus position at a first position to form a first hologram in the transmission type recording medium at the first position, and setting the focus position at a second position to form a second hologram in the transmission type recording medium at the second position, the first position being, different from the second position in the direction of the optical axis, wherein the focused position is moved by moving the transmission type recording medium, and the recording light beam is focused at an angle θ which satisfies sin θ>0.2 with respect to the optical axis.

9. The optical recording method according to claim 8, wherein the interference fringes are recorded at predetermined intervals in an in-plane direction of the transmission type recording medium in respective layers located in predetermined ranges from interfaces of optical recording layers of the transmission type recording medium, and positions of the interference fringes recorded in mutually adjacent ones of the respective layers are respectively offset for recording by a half of the predetermined interval each in the in-plane direction.

10. A recording medium in which data is recorded by the optical recording method according to claim 8.

* * * * *